United States Patent [19]

Wheeler

[11] 3,974,028
[45] Aug. 10, 1976

[54] REACTOR AND METHOD OF OPERATION
[75] Inventor: John A. Wheeler, Princeton, N.J.
[73] Assignee: The United States of America as represented by the United States Energy Research and Development Administration, Washington, D.C.
[22] Filed: May 24, 1946
[21] Appl. No.: 671,997

[52] U.S. Cl. ................................ 176/50; 176/30; 176/41; 176/84
[51] Int. Cl.² .......................................... G21C 5/02
[58] Field of Search ............ 204/154.2; 176/30, 41, 176/50, 84

[56] References Cited
UNITED STATES PATENTS
2,708,656  5/1955  Fermi et al. ...................... 204/193
2,774,730  12/1956  Young ............................... 204/193

FOREIGN PATENTS OR APPLICATIONS
114,150  5/1950  Australia .......................... 204/154.2
861,390  10/1940  France ............................. 204/154.2
233,011  10/1944  Switzerland ..................... 204/154.2

OTHER PUBLICATIONS
Smyth, "Atomic Energy for Military Purposes, " pp. 83, 103, and 104, Aug., 1945.
Kelly et al., *Physical Review* 73, 1135-1139 (1948).

Primary Examiner—Harvey E. Behrend
Attorney, Agent, or Firm—Dean E. Carlson; Arthur A. Churm; Leonard G. Nierman

[57] ABSTRACT
A nuclear reactor having a flattened reactor activity curve across the reactor includes fuel extending over a lesser portion of the fuel channels in the central portion of the reactor than in the remainder of the reactor.

1 Claim, 4 Drawing Figures

U.S. Patent  Aug. 10, 1976  Sheet 1 of 3  3,974,028
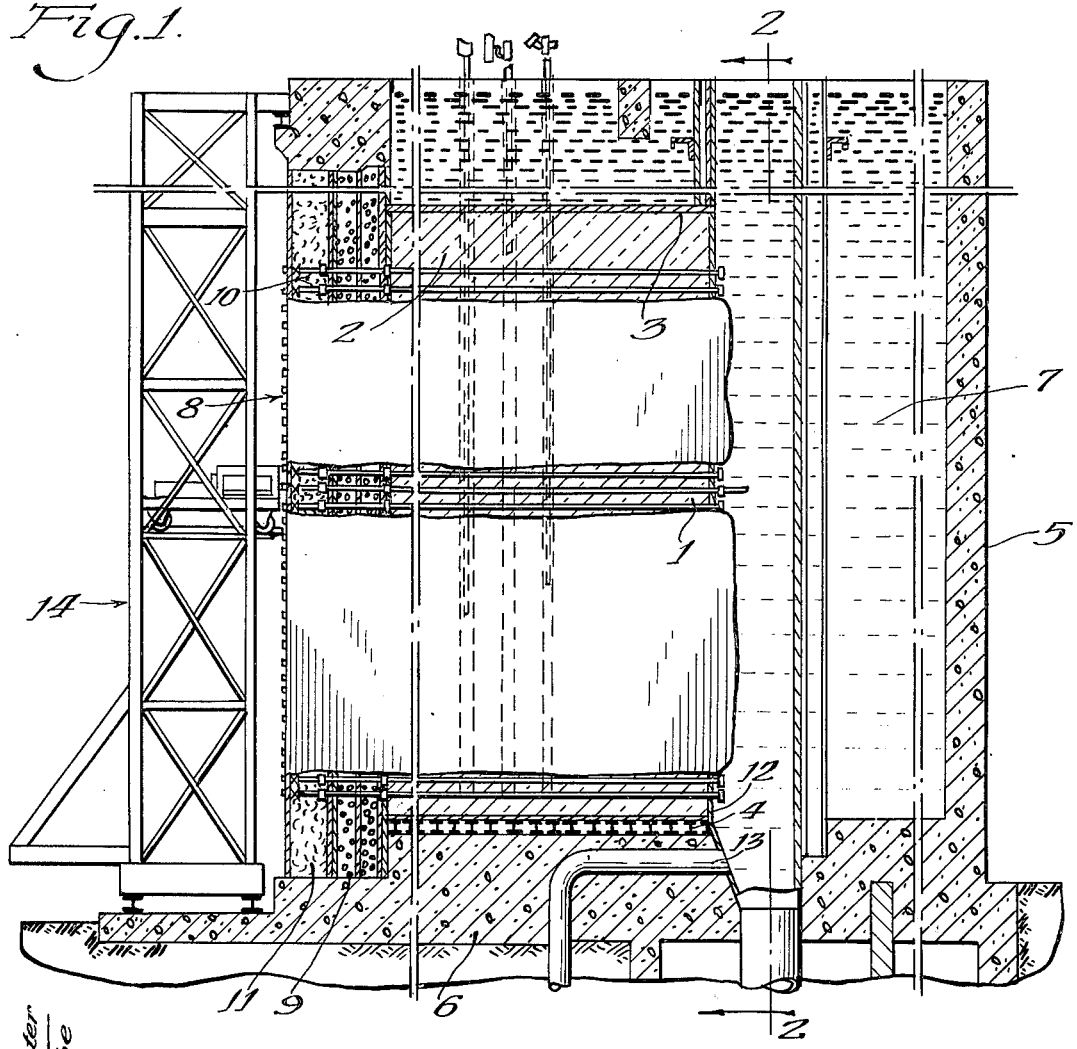
Fig. 1.
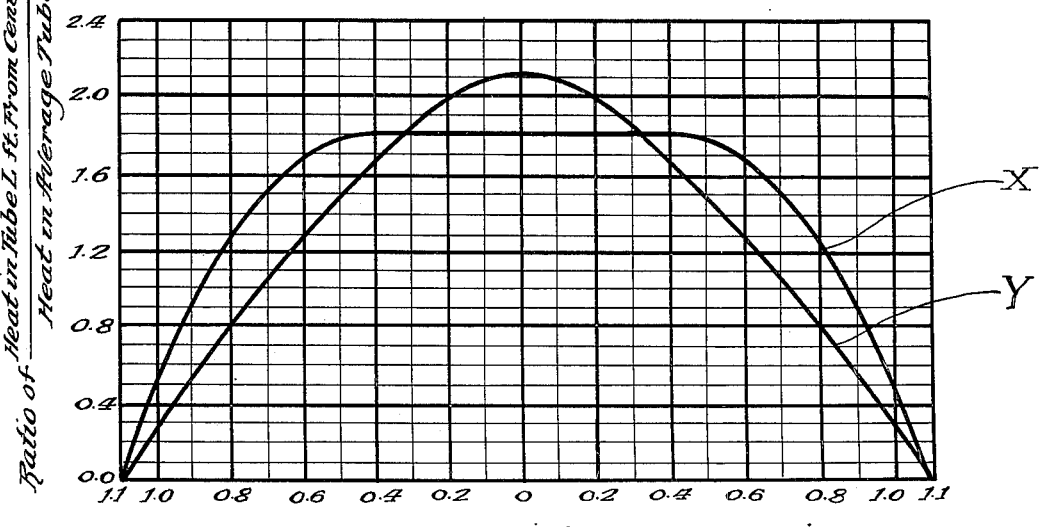
Fig. 4.  $\frac{L}{R} = \frac{\text{Distance From Axis}}{\text{Radius of Metal}}$
Inventor:
John A. Wheeler
Robert A. Lavender
Attorney

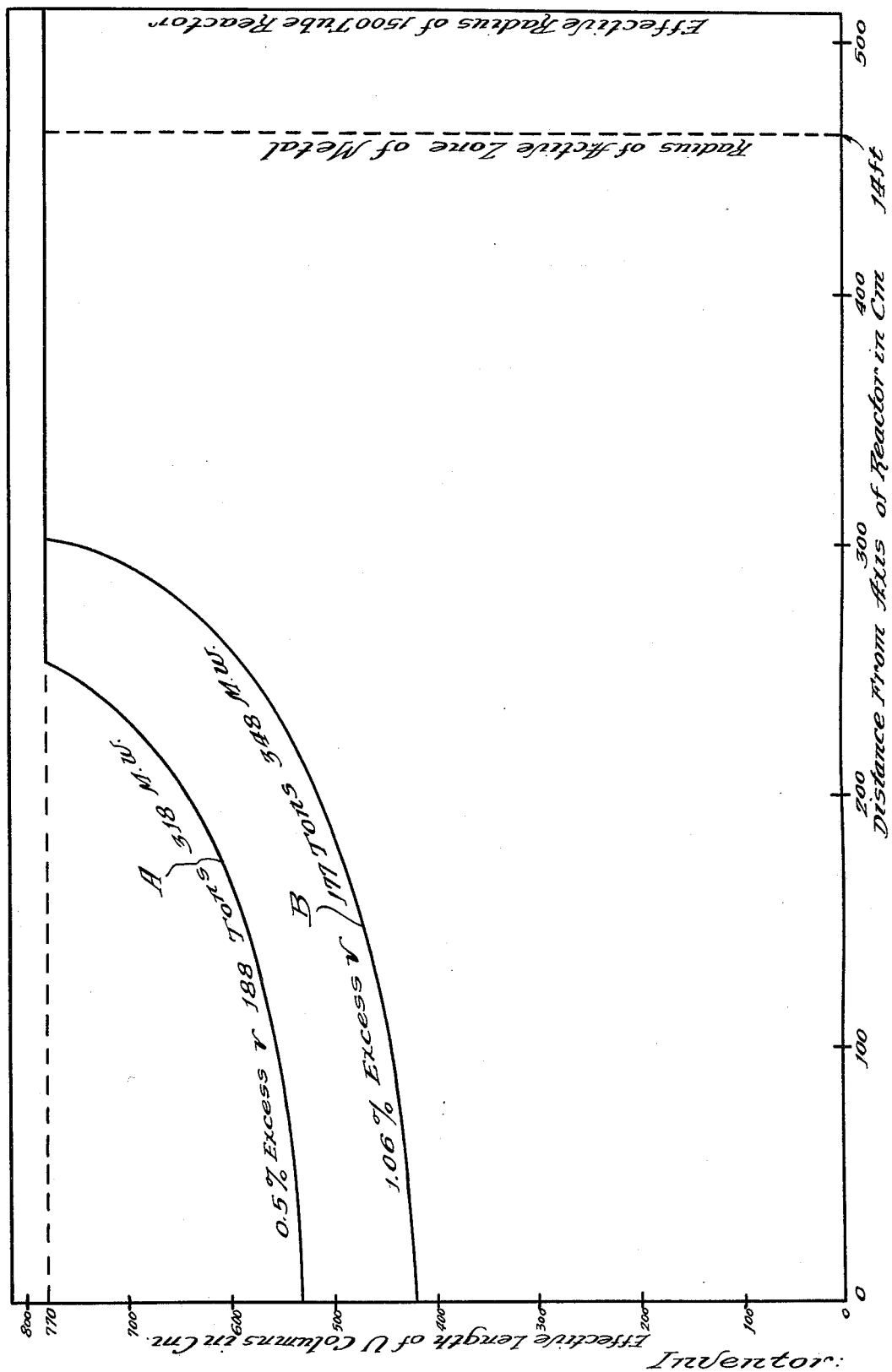

REACTOR AND METHOD OF OPERATION

The present invention relates to a device of primary use for the production of the transuranic element $94^{239}$ by neutrons released during a self-sustaining nuclear chain reaction through fission of uranium with slow neutrons. Such a device, which is usually called a neutronic reactor is more fully described in the copending application of Enrico Fermi and Leo Szilard, Ser. No. 568,904, filed Dec. 19, 1945, now U.S. Pat. No. 2,708,656, issued May 17, 1955. Natural uranium may be used in the reaction and contains the isotopes $92^{238}$ and $92^{235}$ in the ratio of approximately 139 to 1. Hereinafter in the specification and the claims the term uranium is to be understood as referring to uranium and its chemical compositions of normal isotopic content, unless otherwise indicated by the context.

In a self-sustaining chain reaction of uranium with slow neutrons, $92^{238}$ is converted by neutron capture to the isotope $92^{239}$. The latter is converted by beta decay to $93^{239}$ and this $93^{239}$ in turn is converted by beta decay to the transuranic element $94^{239}$. By thermal neutron capture, $92^{235}$, on the other hand, undergoes nuclear fission to release energy appearing as heat, gamma and beta radiation, together with the formation of fission fragments appearing as radioactive isotopes of elements of lower mass numbers, and with the release of secondary neutrons.

The secondary neutrons thus produced by the fissioning of the $92^{235}$ nuclei have a high average energy, and must be slowed down to thermal energies in order to be in condition to cause slow neutron fission in other $92^{235}$ nuclei. While some of the secondary neutrons are absorbed by the uranium isotope $92^{238}$ leading to the production of $94^{239}$, and by other materials, enough can remain to sustain the chain reaction.

Under these conditions, the chain reaction will supply not only the neutrons necessary for maintaining the neutronic reaction, but also will supply the neutrons for capture by the isotope $92^{238}$ leading to the production of $94^{239}$.

As $94^{239}$ is a transuranic element, it can be separated from the unconverted uranium by chemical methods, and as it is fissionable in a manner similar to the isotope $92^{235}$, it is valuable for enriching natural uranium for use in other chain reacting systems of smaller overall size. The fission fragments are also valuable as sources of radioactivity.

The ratio of the number of secondary neutrons produced by the fissions to the original number of primary neutrons producing the fissions in a chain reacting system of infinite size using specific materials is called the reproduction factor of the system and is denoted by the symbol K. When K is made sufficiently greater than unity to create a net gain in neutrons and the system is of a size such that this gain is not entirely lost by leakage from the exterior surface of the system, then a practical self-sustaining chain reacting system producing power by nuclear fission of natural uranium is obtained. The neutron reproduction ratio r in a system of finite size differs from K by the exterior neutron leakage factor, and must still be sufficiently greater than unity to permit the neutron density to rise exponentially. Such rise will continue indefinitely if not controlled at a density corresponding to a desired power output.

To more fully understand the operation of a uranium neutronic reactor, the following brief explanation is given. During the interchange of neutrons in a system comprising bodies of uranium of any size disposed in a slowing medium or moderator, neutrons may be lost in four ways; by absorption in the uranium metal or compound, by absorption in the slowing down material or moderator, by absorption in impurities present in the system, and by leakage out of the system. The neutrons which are not lost by one of the above methods are available for fission of $U^{235}$ which produces more neutrons. In general, several neutrons are produced for each fission induced by a neutron and consequently sufficient neutrons are produced to make up for the neutrons lost and those consumed by the fission of $U^{235}$.

Natural uranium, particularly by reason of its $U^{238}$ content, has an especially strong absorbing power for neutrons when they have been slowed down to moderate energies. The absorption in uranium at these energies is termed the uranium resonance absorption or capture. It is caused by the isotope $U^{238}$ and does not result in fission but creates nucleus $92^{239}$ which decays as previously described. It is not to be confused with absorption or capture of neutrons by impurities, referred to later.

The thermal neutrons are also subject to capture by the moderator. While carbon has a relatively low capture cross-section for thermal neutrons an appreciable fraction of thermal neutrons (about 10 percent of the neutrons present in the system under best conditions with graphite) is lost by capture in the moderator during diffusion therethrough.

All materials present in a uranium reactor except the pure uranium and the pure moderator are classed as impurities. The materials which make up these impurities all absorb neutrons in varying degrees. Since any neutron absorbed by the impurities is lost to the chain reaction, any variation in the impurities present in a neutronic reactor will affect the K factor.

The percentage of neutrons which leak to the outside of the neutronic system and are lost is a function of the geometrical size of the structure. As the volume of the loaded portion of the structure is decreased, the fractional loss of neutrons is increased. Likewise, as a particular dimension of the structure is decreased, the fractional loss of neutrons along that axis is increased. It is thus possible by using different lengths of active material in various zones in the system to construct a system having different neutron losses and therefore different K factors in the various zones.

The neutronic chain reaction referred to can be made self-sustaining in a device known as a neutronic reactor wherein uranium bodies are dispersed in an efficient neutron slowing medium or moderator, when the reactor is made to be above a critical size where the rate of neutron generation inside the reactor is slightly greater than the rate of neutron loss from the exterior of the reactor. Under these conditions, a self-sustaining nuclear chain reaction can be obtained within the reactor having any neutron density desired, up to infinity. However, to prevent destruction of the reactor, the heat of the reaction must be controlled, and then removed by an amount providing a stable temperature in the reactor at some predetermined and controlled operating level. As the greater the number of fissions, the greater the number of neutrons are present to produce $92^{239}$, conversion to $94^{239}$ is accelerated by operating the reactor at high neutron density levels.

A stable temperature in an uncooled neutronic reactor composed entirely of moderator and fissionable material such as, for example, graphite and uranium metal, can only be attained at a relatively low power output as the heat generated can be dissipated only by conduction out of the reactor. Higher power outputs with greater production of $94^{239}$ require additional heat removal such as by circulation of a fluid.

However, proper heat removal is complicated by the fact that in a neutronic reactor where the uranium bodies are in a lattice of uniform size and spacing, and where the impurities are also uniformly spaced nuclear fission and heat generation due to the chain reaction are both greatest at the center of the reactor and least at its edges, both activities following an approximate cosine curve distribution from the center to the edge of the reactor, as will be pointed out later. Such a centrally peaked activity limits the total power at which the reactor can operate, to a power where the more central uranium bodies are operating at a maximum permissible temperature. In other words, the temperature of the uranium at the center of the reactor is a controlling factor. If aluminum tubes and jackets are used with water as a coolant, the maximum permissible temperature of said aluminum jacket is 70°C, since aluminum corrodes quickly in the presence of water at temperatures above 70°C. The total power output, under these circumstances, can therefore be only the average power developed in the reactor when the uranium at the center of the reactor has reached the maximum permissible temperature. If, however, the reactor activity curve can be flattened across the reactor, then the central peak power can still remain at the maximum permissible value and the total power output of the reactor can be increased. One method of flattening this activity curve is described in the copending application of Gale J. Young, Ser. No. 552,730, filed Sept. 5, 1944, now Pat. No. 2,774,730.

It is the principal object of our invention to produce a cooled neutronic reactor wherein the maximum heat generation due to nuclear fission is spread out over a large volume of the reactor so that operating power can be increased without excessive corrosion.

Flattening of the reactor activity curve across the reactor is also advantageous in that the local heat generation is directly proportional to the local absorption of neutrons by $U^{238}$. In other words $94^{239}$ will eventually be formed in the uranium bodies in accordance with the neutron density to which the bodies are exposed. Flattening the reactor activity curve across the reactor will permit a greater number of uranium bodies to be subjected to high neutron densities.

As the volume of fissionable material can control the K factor of a reactor structure, lattices having different effective lengths of fissionable material in different zones can provide different K factors in a neutronic reactor. Ordinarily, neutronic reactors have lattices in which uranium bodies of uniform size and shape and purity are placed in the moderator with uniform spacing throughout, the bodies are generally of substantially uniform size and uniform volumes of coolant are used. This results, in the absence of compensating factors, in a reactor having a peaked central neutron density, and in consequence, a peaked central heat production.

However, by using lattices having different total lengths of uranium in different zones of the reactor, and using shorter lengths in the center as compared to the remainder of the reactor to give the lowest K factor in the center zone of the reactor, the reactor activity curve can be appreciably flattened across the reactor, resulting for the same total power, in lowering the relative central peak neutron density and in raising the neutron density in outer zones. In consequence, the activity is spread more uniformly throughout the reactor. Cooling becomes more efficient and when the central uranium bodies are raised to their maximum permissible operating temperature, the total power output of the reactor with a flattened activity curve across the reactor is increased for the same central uranium body temperature. The amount of uranium exposed to high neutron densities is increased, and the yield of $94^{239}$ is thereby increased.

It is another object of our invention to flatten the neutron activity curve across a liquid cooled reactor and at the same time to provide increased cooling at central portions of the reactor.

The amount of heat that can be removed from a reactor depends upon the amount of coolant in the reactor and the rate at which it can be circulated. A reactor can operate at about 500,000 K.W. continuously with coolant annulus thickness of about 2 mm. for water. After the point is reached where the rate of circulation can no longer be efficiently increased in annuli of fixed thickness, further increase in power leads to a too high temperature of the coolant which causes excessive corrosion of the aluminum pipes and jackets.

As heretofore explained proper heat removal is complicated by the fact that in a neutronic reactor where the uranium bodies are in a lattice of uniform size and spacing nuclear fission and heat generation due to the chain reaction are both greatest at the center of the reactor and least at its edges, both activities following an approximate cosine curve distribution across the reactor with the peak of the curve at the center of the reactor.

However, by having the coolant tubes a standard size throughout the lattice, but loading shorter lengths of fissionable material in the central tubes than are loaded in the outer tubes, the K factor distribution curve may be flattened allowing an increase in overall power without increasing the K factor in the center. Furthermore, since the central tubes contain less fissionable material, it is possible to flow more coolant through them without increasing the inlet water pressure than when they are filled.

Actually a continuous change in length of loaded fissionable material from the shortest central tubes to the longest loaded outer tubes gives the optimum result. However, it may be more convenient from an operating standpoint to divide the reactor into several zones in which each tube in a particular zone is charged with fissionable material to an equal length. The invention is applicable to either the modification of a completed reactor or the design of a new reactor.

Other objects and advantages of my invention may be more clearly understood by reference to the following description and the attached drawings which illustrate, as an example, one form of reactor in which the invention may be used. This example of a uranium-graphite, water-cooled reactor is not to be taken as limiting, as the invention, within the scope of the appended claims, can be used in any type of neutronic reactor wherein uranium bodies or other fissionable bodies are disposed in a moderating medium.

In the drawings, which are not necessarily drawn to scale:

FIG. 1 is an elevational view partially in cross-section of a liquid cooled neutronic reactor;

FIG. 3 is a graph showing two plans for loading a reactor with uranium in which the best length of uranium for each portion of the reactor is shown; and FIG. 4 is a graph showing power output plotted across a reactor both for standard loading and loading according to the present invention.

Figure 2:
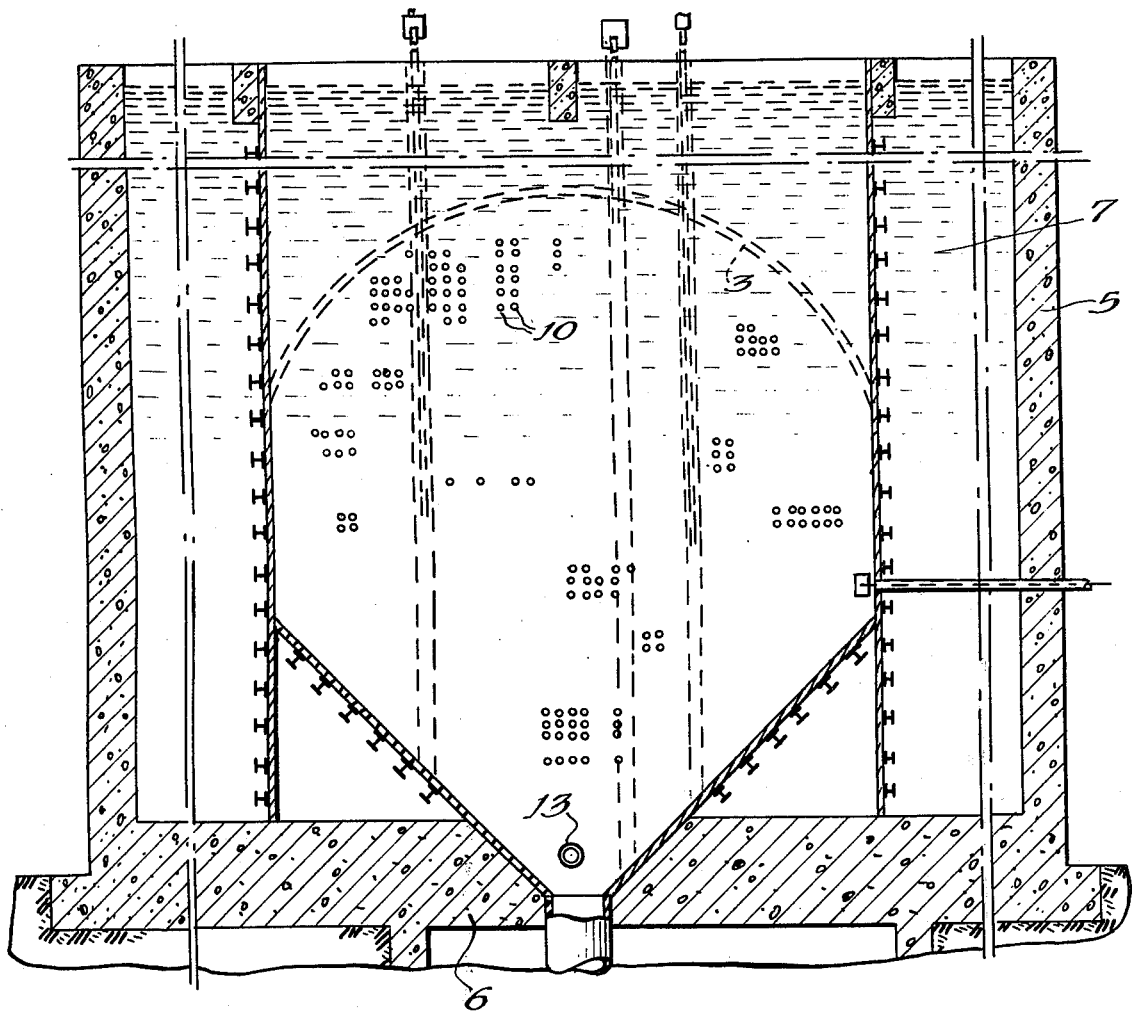
FIG. 2 is an elevational view partially in cross-section taken on the line 2—2 of FIG. 1.

Referring to the drawings, the invention will be described as embodied in a water cooled, graphite moderated uranium reactor in which the uranium is in the form of aluminum jacketed short rods, sometimes called slugs, positioned end-to-end in horizontal coolant carrying passages in the graphite moderator.

Such a reactor embodying liquid cooling for high power outputs, up to 500,000 kilowatts, for example, is shown in FIGS. 1 and 2. Specific features of this reactor are more fully described, and claimed in the application of Edward Creutz et al., Ser. No. 574,153, filed Jan. 23, 1945, now Pat. No. 2,910,418 dated Oct. 27, 1959.

The reactor proper comprises a cylindrically shaped structure built of graphite blocks 1. The reactor is surrounded with a graphite reflector 2 forming an extension of the moderator and is enclosed by a fluid tight steel casing 3, supported in I beams 4 within a concrete tank 5, erected on foundation 6. Tank 5 is preferably filled with water 7 to act as a shield for neutrons and gamma radiation.

The encased reactor is surrounded on all sides except one by the water 7, and the side not surrounded, which is to be the charging face 8 of the reactor is provided with a shield tank 9 filled, for example, with lead shot and water.

Coolant tubes 10, preferably of aluminum extend through the adjacent concrete wall 11, through shield tank 9, through the graphite moderator blocks 1 to an outlet face 12 of casing 3 to empty into water 7 in tank 5. Only a few tubes 10 are shown in FIG. 1 for sake of clarity of illustration.

On the outside of tank 5 where the coolant tubes 10 enter the reactor, the ends of the coolant tubes are removably capped, and are supplied with coolant under pressure from conveniently positioned manifolds. Thus water can be passed through tubes 10 to be discharged at outlet face 12 into tank 5. Water, after having passed through the reactor is removed through outlet pipe 13.

The coolant tubes 10 may then be charged with short aluminum jacketed uranium slugs by uncapping the tube to be loaded and pushing slugs into the tubes in end to end relationship by a loading mechanism 14. The reactor can be loaded with sufficient uranium to make the reactor operative to produce high neutron densities, the heat being dissipated by the coolant circulation. This coolant may be water, for example, from a source such as a river, passed once through the reactor, and then discarded, or, the water may be cooled and recirculated in a closed system. Some of the dimensions of one reactor which has been successfully operated are as follows:

overall dimensions of the moderator 36 ft. wide × 36 ft. high × 28 ft. deep reflector — 2 feet thick
cooling tubes — 2004 in number
cooling tubes inside diameter 1.611 inches
annular water space — 0.086 inches.

With 1500 central water tubes 10 filled to capacity with uranium slugs, two hundred short tons of uranium are contained in the reactor. This loading of 1500 tubes will make the reactor considerably above critical size and provide an excess reproduction ratio. (Critical size is the size at which a reactor is just chain-reacting and the reproduction ratio is 1).

As has been explained, if all of the 1500 tubes are loaded full length with uranium the power in the form of heat generated in the central tube becomes the limiting factor in operation. The power developed will follow a curve similar to curve Y in FIG. 4.

However, in accordance with the present invention, the reactor may be loaded with less fissionable material in the transversely central passages than at the edges, in which case the power curve may be similar to curve X of FIG. 4. It will be noted in FIG. 4 that the ratio of heat in a tube disposed L feet from the center of the reactor to heat in the average tube is plotted on the ordinate and the ratio of the distance of a tube L feet from the axis to the total radius of metal is plotted along the abscissa.

The amount of excess reproduction ratio that is available when the 1500 tubes of the reactor are fully loaded with 200 tons of uranium will determine the amount of metal that may be removed from the central tubes without making the reactor smaller than critical size. The curves shown in FIG. 3 depict the lengths of uranium metal from the shortest loaded tube at the axis of the reactor to the longest loaded tube 10 near the periphery of the active zone. The dotted line represents the greatest effective length of uranium which the reactor will hold. Curve A shows a loading design for a reactor, as described, which if it contained 200 tons of metal with 1500 tubes fully loaded would have a reproduction ratio of 1.005 or an excess reproduction ratio of 0.5%. This excess reproduction ratio may be used by loading the 1500 tubes with 188 tons of metal in accordance with curve A where the shortest central tube will be loaded with uranium to an effective length of 540 cms. The remainder of the tube may be loaded with spacers of an inactive material such as carbon or aluminum. Starting with the axial tube, the tubes are loaded with increasing lengths of uranium, as shown in curve A, until the tubes located about 250 cms. from the axis are fully loaded to approximately 760 cms. effective length. The remaining tubes located outside the 250 cms. radius to the outside radius are fully loaded to 760 cms. effective length.

The effective length from a point at a distance from each end of the uranium where the neutron density extrapolates to zero. It is slightly longer than the actual length; the difference between actual and effective length depending on the efficiency of the reflector 2. A reactor loaded in accordance with curve A under optimum conditions will yield 318 megawatts.

Curve B depicts a proper loading for a reactor which when 1500 tubes are loaded with 200 tons of uranium would have a reproduction ratio of 1.0106 or an excess of 1.06%. With only 177 tons of uranium loaded in accordance with curve B, the reactor will be chain reacting and capable, under optimum conditions, of delivering 348 megawatts. Thus, it will be noted in comparing curves A and B that with proper loading the power output may be increased although the amount of fissionable material is decreased. This, of course, is due to the flattening of the neutron reproduction curve so that a larger number of the tubes are brought up to or near maximum power.

A reactor has been described in which the amount of fissionable material in the central tubes has been shortened in one direction. This will flatten the neutron activity curve along one axis. Provided sufficient excess reproduction ratio is available, it would be possible to change the loading in accordance with the present invention in two dimensions of the reactor, thus flattening the neutron activity curve on two axes.

It will be understood that the method and apparatus described are illustrative only. The invention is limited only by the appended claims.

What is claimed is:

1. A water-cooled neutronic reactor comprising a core consisting of a mass of graphite 36 feet high, 36 feet wide, and 28 feet deep, having a lattice consisting of 2004 equally spaced horizontal, parallel passages of uniform length extending therethrough, said passages being 1.611 inches in diameter, aluminum-jacketed short rods of uranium disposed in end-to-end abutting relationship in 1500 central passages comprising an active zone of the reactor, the radius of the active zone being 14 feet, said central passages being otherwise empty, the uranium rods being surrounded by an annular water space 0.086 inch in thickness, the total length of fissionable material in the passages being smaller at the axis of the reactor than at the edge of the reactor and the total length of fissionable material in each passage being given in FIG. 3 of the drawing, thereby obtaining a flattened flux as indicated by curve X in FIG. 4 of the drawing.

* * * * *